United States Patent
Izawa et al.

(10) Patent No.: US 6,440,347 B1
(45) Date of Patent: Aug. 27, 2002

(54) METHOD OF MANUFACTURING ROLLER FOR FIXING COVERED WITH TUBE

(75) Inventors: Satoru Izawa, Shizuoka-ken; Masahiro Goto, Mishima, both of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/449,739

(22) Filed: Nov. 26, 1999

(30) Foreign Application Priority Data

Nov. 30, 1998 (JP) .......................................... 10-355412

(51) Int. Cl.[7] .................... B29C 33/76; B29C 45/14; B29C 63/18; B29C 65/70
(52) U.S. Cl. ................... 264/262; 264/276; 29/895.23; 29/895.32
(58) Field of Search ................. 264/261, 262, 264/263, 242, 264, 134, 135, 276; 29/895, 895.21, 895.22, 895.23, 895.3, 895.32

(56) References Cited

U.S. PATENT DOCUMENTS

| | | | | |
|---|---|---|---|---|
| 3,613,168 A | * | 10/1971 | Rowland et al. | 264/262 |
| 3,912,901 A | * | 10/1975 | Strella et al. | 219/216 |
| 4,263,237 A | * | 4/1981 | Weeden et al. | 264/262 |
| 4,804,576 A | * | 2/1989 | Kuge et al. | 428/422 |
| 5,089,201 A | * | 2/1992 | Takahashi | 264/135 |
| 5,417,905 A | * | 5/1995 | Lemaire et al. | 264/261 |
| 5,486,908 A | * | 1/1996 | Miyamoto et al. | 355/290 |
| 5,711,072 A | * | 1/1998 | Nakamura | 29/895 |
| 5,753,165 A | * | 5/1998 | Watanabe et al. | 264/138 |
| 6,141,873 A | * | 11/2000 | DelRosario et al. | 29/895.211 |
| 6,168,751 B1 | * | 1/2001 | DelRosario et al. | 264/262 |

FOREIGN PATENT DOCUMENTS

| | | |
|---|---|---|
| JP | 50-7097 | 1/1975 |
| JP | 51-27276 | 3/1976 |
| JP | 61-169863 | 7/1986 |
| JP | 2-157878 | 6/1990 |
| JP | 4-44075 | 2/1992 |
| JP | 4-44076 | 2/1992 |
| JP | 4-44077 | 2/1992 |
| JP | 4-44078 | 2/1992 |
| JP | 4-44079 | 2/1992 |
| JP | 4-44080 | 2/1992 |
| JP | 4-44081 | 2/1992 |
| JP | 4-44082 | 2/1992 |
| JP | 4-44083 | 2/1992 |
| JP | 4-204980 | 7/1992 |
| JP | 63-313182 | 12/1998 |

* cited by examiner

*Primary Examiner*—Angela Ortiz
(74) *Attorney, Agent, or Firm*—Fitzpatrick, Cella, Harper & Scinto

(57) ABSTRACT

A method of manufacturing a tube-covered roller for fixing includes a step of setting a core material in a substantially central portion of a cylindrical mold and setting, outside the core material, a tube and a resin layer which is capable of coming into contact with an inner surface of the mold, a step of putting a rubber material between the core material and the tube and hardening the rubber material to produce a roller, and a step of, after detaching the roller covered with the tube and the resin layer from the mold, removing the resin layer from the roller.

22 Claims, 5 Drawing Sheets

METHOD OF MANUFACTURING ROLLER FOR FIXING COVERED WITH TUBE

BACKGROUND OF THE INVENTION

1. Field of the Invention

The present invention is, for example, for an image forming apparatus employing an image forming process such as electrophotographic technique or electrostatic recording technique, and relates to a method of manufacturing a tube-covered roller for use in a heat fixing device which, for a fixed image, carries out a heat fixing treatment of an unfixed toner image of image information formed and born on a recording member (including a transfer member, a print paper sheet, a light-sensitive paper sheet and an electrostatic recording paper sheet) according to a transfer mode or a direct mode in an image forming process portion.

2. Description of Related Art

As a fixing device included in an image forming apparatus employing electrophotographic technique or electrostatic recording technique, there has widely been used a so-called heating roller type heat fixing device which fixes an unfixed toner image, as a permanent image, on a recording member by causing the recording member, which bears the unfixed toner image thereon, to pass through a nip portion formed by a fixing roller (heating roller) and a pressure roller which are rotated in a state of coming into pressed contact with each other.

In addition, as a heat fixing type system which does not supply electric power to a heat fixing device, particularly, at the time of standby, to reduce the power consumption to the utmost, a film heating type heat fixing device designed to fix a toner image on a recording member through a thin film between a fixing roller and a pressure roller has been disclosed, for example, in Japanese Laid-Open Patent Application No. Sho 63-313182, Japanese Laid-Open Patent Application No. Hei 2-157878, Japanese Laid-Open Patent Application No. Hei 4-44075, Japanese Laid-Open Patent Application No. Hei 4-204980, etc.

In such a heat fixing device, in order that a toner image can be fixed on a recording member without offset, a release-characteristics layer, such as a polytetrafluoroethylene (PTFE) or a perfluoroalkoxy tetrafluoroethylene copolymerizate (PFA), which shows a high ability in release characteristics, is formed on the uppermost layers of the fixing roller, the film and the pressure roller.

The release-characteristics layer is formed into a tube-like configuration, or is formed by an electrostatic spray, a dipping coating, or the like.

In addition, for the purpose of preventing the offset occurring when the surface of a fixing roller is charged up due to the conveyance of a recording member, the release-characteristics layer is sometimes doped with a conductive material such as a carbon black.

Alternatively, for example, employed is a pressure roller of the type in which a surface of the pressure roller is coated with a mixture of a fluoro rubber and fluoro-resin (fluoroplastic), such as Daiel-Latex GLS-213 (trade name, produced by Daikin Industries Ltd).

In particular, in order to satisfy a high durability and a high release stability according to the speedup of an image forming apparatus, a pressure roller covered with a tube has been employed frequently in recent years.

FIG. 6 is an illustration of a model of an example of the aforesaid pressure roller with a layer construction. A pressure roller 40 is made to have a tube-like configuration in such a manner that a sponge elastic layer 42 formed by forming a silicone rubber or a fluoro rubber, or by foaming a silicone rubber is formed on the exterior of a core 41 and a release-characteristics layer 43 made of a PTFE, a PFA, an FEP or the like is additionally formed on the sponge elastic layer 42.

As a method of manufacturing the aforesaid pressure roller 40, there has been known a method in which a core made of a metal such as aluminum is placed upright in the interior of a cylindrical mold so that a liquid silicone rubber is injected into the gap between the core and the mold to be vulcanized for curing, or a predetermined quantity of liquid silicone rubber is first injected into a blind-end cylindrical mold and a core is inserted into the mold so that the liquid silicone rubber rises in the gap between the core and the mold to cause the gap therebetween to be filled with the liquid silicone rubber, and then vulcanized for curing, and a surface of the cured silicone rubber is covered with a tube made of a fluororesin such as a PFA, a PTFE or the like and serving as the aforesaid release-characteristics layer.

However, the following problem will arise with the above-described manufacturing method as will be described hereinbelow.

The work of covering a pressure roller released from the mold with a fluororesin-made tube is difficult, so that there is a possibility that distortion occurs on the tube formed as the surface of the pressure roller or the tube is damaged.

For this reason, a method of accomplishing the formation of the silicone rubber and the coating of the fluororesin-made tube concurrently has taken place as disclosed in Japanese Laid-Open Patent Application No. Sho 50-7097, Japanese Laid-Open Patent Application No. Sho 51-27276, Japanese Laid-Open Patent Application No. Sho 61-169863, etc.

That is, as shown in FIG. 7, molds 52a and 52b constituting upper and lower end portions are fitted in a cylindrical mold 51, and the end portion mold 52a has an opening 53 for injection of a liquid silicone rubber. In manufacturing a pressure roller, a core 41 made of aluminum or the like and a fluororesin tube 43 coated with a primer after etching of its inner surface are successively mounted in and on the end portion mold 52a, and the end portion mold 52a equipped with the core 41 and the fluororesin tube 43 is fitted in one end of the cylindrical mold 51. Following this, the end portion mold 52b is fitted in an opening portion of the other end of the cylindrical mold 51, and a liquid silicone rubber 42 is injected under a high pressure through an injection opening 53 of the end portion mold 52a into the gap between the core 41 and the fluororesin tube 43 so that the gap therebetween is filled with the liquid silicone rubber 42. This filling pressure causes the expansion of the fluororesin tube 43 for the close attachment thereof to the inner circumferential surface of the cylindrical mold 51, so that the fluororesin tube 43 is integrated with the silicone rubber material 42.

Alternatively, a porous elastic material or member (silicone sponge) obtained by foaming a silicone rubber is shaped on a core and polished or ground up to a dimension of a predetermined outer diameter, while a non-shrinkable fluororesin tube having a diameter smaller than the outer diameter of the elastic material is expanded in a pressure-reducing container and the polished roller is inserted into the expanded tube. After the completion of the insertion thereinto, the assembly is again put under a normal pressure or the atmospheric pressure, so that the fluororesin tube is closely attached to an outer surface of the sponge elastic layer.

The above-described method has been employed for the fabrication of the pressure roller included in the heat fixing device.

However, the above-described pressure roller manufacturing method creates the following problems.

That is, at the setting of the fluororesin tube in the cylindrical mold or at the handling during the manufacturing process, it is considerably difficult that the pressure roller manufacturing worker performs operations without touching the surface of the fluororesin, so that there is a possibility of damages to the tube.

In addition, since the inner surface of the cylindrical mold directly comes into contact with the surface of the pressure roller at the formation, there is a possibility that the scratches or attached matters on the inner surface of the cylindrical mold are transferred directly onto the surface of the pressure roller.

Because of the above-mentioned problems, the release ability of the surface of the fluororesin layer of the pressure roller sometimes drops. In this case, when a toner image offsets at the fixing nip portion of the heat fixing device, or when a recording member is removed from the fixing nip portion in the paper ejecting direction in a case where a paper jam occurs in the image forming apparatus in such a state that the unfixed toner is on the recording member, the toner attached onto the surface of the fixing member is once carried to the surface of the pressure roller, so that the toner tends to adhere as a contaminating toner onto the surface of the pressure roller. At this time, if the pressure roller shows sufficient release characteristics, the contaminating toner adheres onto the rear surface (the surface which comes into contact with the pressure roller) of a recording member conveyed next, and the surface of the pressure roller again returns to a clean surface where no contaminating toner exists. On the other hand, if the surface of the pressure roller has flaws or scratches as mentioned above, or if attached substances exist thereon, because of no sufficient release characteristics, the contaminating toner is not completely removable, but accumulates thereon. Accordingly, in the worst case, for example, there arises a problem in that the adhesive strength by the contaminating toner increases between the recording member and the surface of the pressure roller, so that the recording member is wound around the surface of the pressure roller.

BRIEF SUMMARY OF THE INVENTION

Accordingly, it is an object of the invention to provide a tube-covered roller for fixing which does not have attached substances, scratches or the like on its surface.

Another object of the invention is to provide a method of manufacturing a tube-covered roller for fixing, comprising a step of setting a core material in a substantially central portion of a cylindrical mold and setting, outside the core material, a tube and a resin layer which is capable of coming into contact with an inner surface of the mold, a step of putting a rubber material between the core material and the tube and hardening the rubber material to produce a roller, and a step of, after detaching the roller covered with the tube and the resin layer from the mold, removing the resin layer from the roller.

A further object of the invention is to provide a method of manufacturing a tube-covered roller for fixing, comprising a step of placing a resin layer on a tube, a step of covering a roller having a rubber layer with the tube having the resin layer placed thereon, and a step of removing the resin layer from the roller covered with the tube.

A still further object of the invention is to provide a method of manufacturing a tube-covered roller for fixing, comprising a step of setting a core material in a substantially central portion of a cylindrical mold, setting a tube outside the core material and setting a cylindrical resin member outside the tube in such a way as to come into contact with an inner surface of the mold, a step of putting a rubber material between the core material and the tube and hardening the rubber material to produce a roller, and a step of detaching the roller covered with the tube from the resin member left at the mold.

The above and other objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

First Embodiment
(FIG. 1 to FIGS. 3A and 3B)

Figure 1:
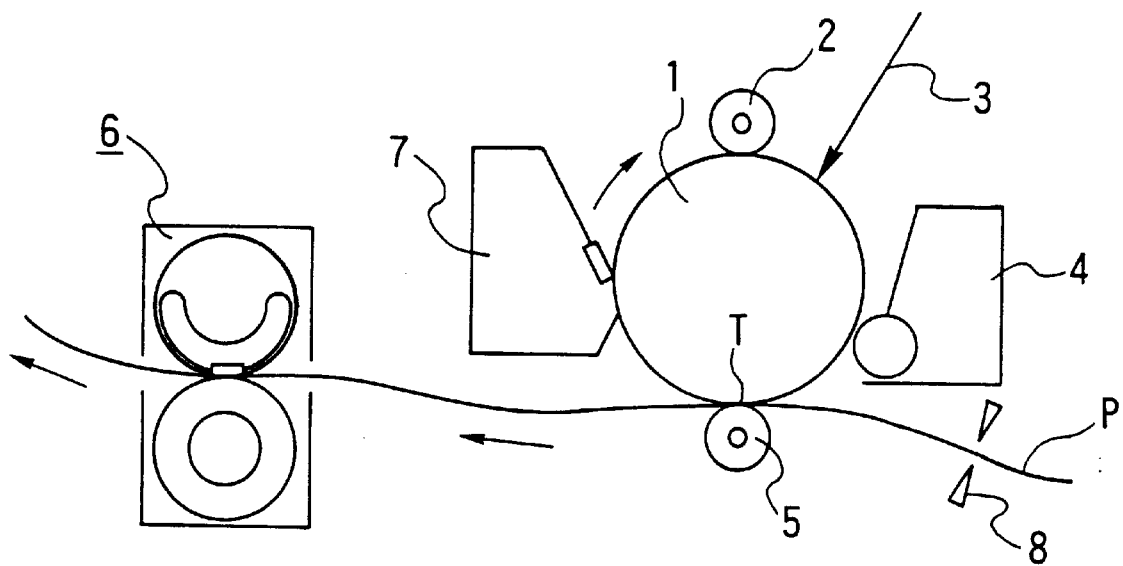
FIG. 1 is a schematic diagram showing, by way of example, the construction of an image forming apparatus.

FIG. 1 is a schematic diagram showing, by way of example, the construction of an image forming apparatus. In this example, the image forming apparatus is a laser beam printer employing a transfer type electrophotographic process.

In FIG. 1, reference numeral 1 denotes a rotary drum type electrophotographic photosensitive member (which will be referred to hereinafter as a photosensitive drum) serving as an image bearing member. In this photosensitive drum 1, a photosensitive material layer made of OPC, amorphous Se, amorphous Si or the like is formed on a cylindrical conductive base made of aluminum, nickel or the like. The photosensitive drum 1 is driven to rotate at a predetermined peripheral velocity (process speed) in a clockwise direction indicated by an arrow.

First of all, in the rotation process of the photosensitive drum 1, the surface thereof is evenly or uniformly charged by a charging roller 2 serving as a charging device to have a predetermined polarity and a predetermined electric potential.

Subsequently, the photosensitive drum 1 receives a laser beam scanning exposure 3 corresponding to an intended image information pattern by a laser scanner (not shown) serving as an exposure device. Accordingly, an electrostatic latent image corresponding to the intended image information pattern is formed on the surface of the photosensitive drum 1.

The laser scanner outputs a laser beam under ON/OFF control by a time series electric digital pixel signal corresponding to an intended image information pattern sent from an external unit such as a host computer, or the like. This laser beam scans a uniformly electrification-treated surface of the rotary photosensitive drum 1 for exposure.

The electrostatic latent image formed on the surface of the rotary photosensitive drum 1 is toner-developed in a developing device 4 to be brought into a visible image. Among the developing ways, there are the jumping developing method, the two-component developing method, the FEED developing method and others. In many cases, the image exposure and the reversal development are combined in use.

The toner image formed on the surface of the rotary photosensitive drum 1 is sequentially transferred onto a recording member (transfer member) P, fed from a paper-feeding portion (not shown) at a predetermined control timing, in a transfer nip portion T formed by the photosensitive drum 1 and a transfer roller 5 which serves as a transfer device brought into contact with the photosensitive drum 1 at a constant pressure.

A predetermined transfer bias is applied from a power supply (not shown) to the transfer roller 5 at a predetermined control timing to work so that the toner image on the surface of the photosensitive drum 1 is sequentially transferred onto a surface of the recording member P conveyed in a state of being nipped in the transfer nip portion T.

Reference numeral 8 denotes a sensor for detecting the leading edge of the recording member P conveyed from the paper feeding portion to the transfer nip portion T. That is, the sensor 8 detects the leading edge of the recording member P to set a timing so that the image formation position of the toner image on the photosensitive drum 1 coincides with the writing start position at the leading edge of the recording member P.

The recording member P, after receiving the transferred toner image in the transfer nip portion T and passing through the transfer nip portion T, is separated from the surface of the rotary photosensitive drum 1 and is then conveyed to a heat fixing device 6, where the toner image is fixed, as a permanent image, on the recording member P.

Meanwhile, the residual toner remaining on the photosensitive drum 1 after the transfer is removed from the surface of the photosensitive drum 1 by a cleaning device 7.

In this example, the heat fixing device 6 is of a film heating, pressure roller driving and tensionless type using a cylindrical fixing film, such as those disclosed in Japanese Laid-Open Patent Applications No. Hei 4-44075 to No. Hei 4-44083. The heat fixing device 6 may also be of a heat roller type.

Figure 2:
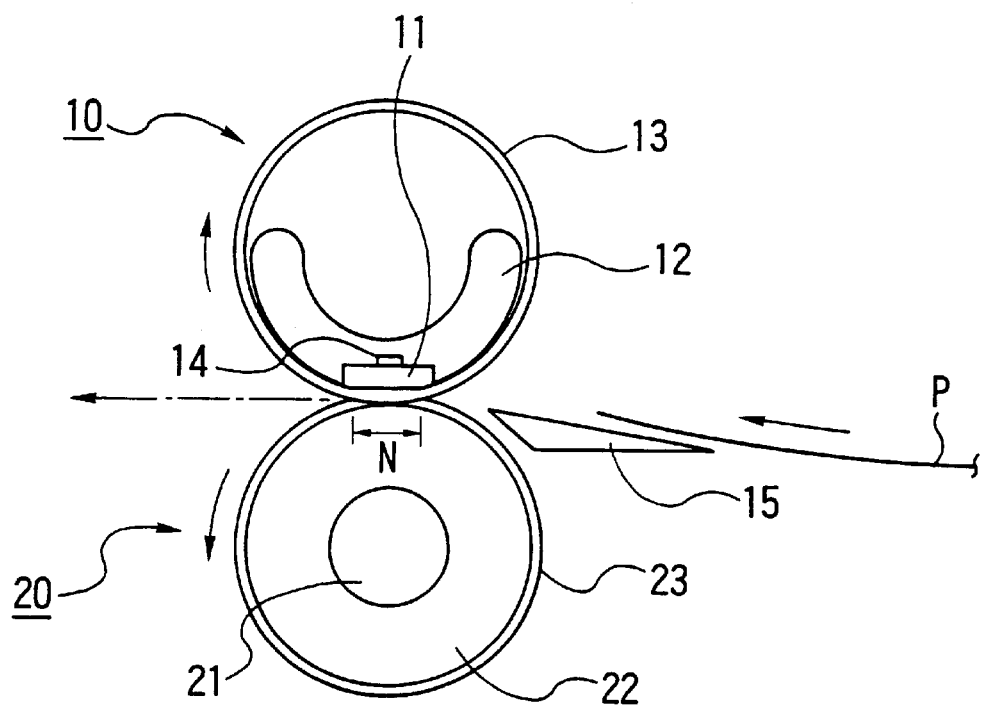
FIG. 2 is a schematic diagram showing the construction of a heat fixing device.

FIG. 2 is a horizontal cross-sectional view showing, in the form of a model, the heat fixing device 6. In FIG. 2, reference numerals 10 and 20 denote respectively a fixing member and a pressure member forming a fixing nip portion N in a state of being brought into contact with each other.

The fixing member 10 is made up of a heating unit 11, a thermal-insulation stay holder 12, a fixing film 13 and others. The pressure member 20 is an elastic pressure roller serving as a roller for fixing.

The heating unit 11 is an elongated thin ceramic heater (extending long in a direction perpendicular to the paper surface of the drawing) (which will be referred to hereinafter as a heater).

The thermal-insulation stay holder 12 is a member for holding the heater 11 and preventing the heat radiation in a direction opposite to the fixing nip portion N, and is made of a liquid crystal polymer, a phenol resin, a PPS, a PEEK or the like. In this example, the thermal-insulation stay holder 12 has a horizontally elongated configuration and a generally semi-arc tub-like horizontal cross portion, and is made from a material having a heat-resisting property, an electrically insulating characteristic and a large-load bearable characteristic, while the heater 11 is fitted and fixedly supported in a groove portion made along a longitudinal direction at a substantially central portion of the lower surface of the thermal-insulation stay holder 12 so that the front surface side of the heater 11 is exposed downwardly.

The fixing film 13 is a cylindrical heat-resisting film, and is loosely fitted over the thermal-insulation stay holder 12 including the heater 11 in such a state that a margin takes place with respect to the thermal-insulation stay holder 12, with the thermal-insulation stay holder 12 supporting the fixing film 13 from its inner surface side.

The fixing film 13 shows a small thermal capacity, and for allowing the quick start, has a thickness of below 100 $\mu$m in total, with its base layer being made of a polyimide, a polyamide-imide, a PEEK, a PES, a PPS, a PFA, a PTFE, an FEP or the like which show a heat-resisting property and a thermal plasticity. Additionally, for achieving a long-life heat fixing device, the film is required to have a thickness of above 20 $\mu$m in total for offering a sufficient strength. and an excellent durability. For this reason, it is most preferable that the overall thickness of the fixing film 13 is between 20 $\mu$m and 100 $\mu$m. Still additionally, for securing the offset prevention and the separation of the recording member, the surface of the fixing film 13 is coated with a high-release-characteristics heat-resisting resin, such as a PFA, a PTFE, an FEP, a silicone resin or the like, with these resins for the coating being used singly or mixed.

A construction and a manufacturing method of the elastic pressure roller 20 serving as a pressure member will be described in detail later.

The elastic pressure roller 20 is held by a bearing member (not shown), and is pressed sufficiently by a pressurizing means (not shown) at the two ends in the longitudinal direction thereof, so that the fixing film 13 is nipped with respect to the downward surface of the heater 11, fixedly supported on the lower surface side of the thermal-insulation stay holder 12, to form the fixing nip portion N needed for the heat fixing.

The pressure roller 20 is driven to rotate in a counter-clockwise direction, indicated by an arrow, by a drive means (not shown). Due to the rotational drive of the pressure roller 20, a contact frictional force at the fixing nip portion N between the outer surface of the pressure roller 20 and the outer surface of the fixing film 13 gives a rotating force to the fixing film 13 so that the fixing film 13 is, at its inner surface, brought closely into contact with the downward surface of the heater 11 at the fixing nip portion N to be driven to rotate around the thermal-insulation stay holder 12 at a peripheral velocity substantially corresponding to the rotational peripheral velocity of the pressure roller 20 in the clockwise direction, indicated by an arrow, while sliding thereon.

In this case, of the cylindrical fixing film 13 driven to rotate around the thermal-insulation stay holder 12, other than a portion of the fixing film 13 at the fixing nip portion N and in the vicinity thereof is in a tension-free condition (a condition of no tension).

Since the fixing film 13 rotates while the inner surface side thereof is sliding on the heater 11 and a portion of the outer surface of the thermal-insulation stay holder 12, there is a need to reduce the frictional resistance between the heater 11 or the thermal-insulation stay holder 12 and the fixing film 13. For this reason, a little lubricant such as a heat-resisting grease is placed on the surfaces of the heater 11 and the thermal-insulation stay holder 12, so that the fixing film 13 can rotate smoothly.

Thus, with the pressure roller 20 driven to rotate, the cylindrical fixing film 13 is driven to rotate around the thermal-insulation stay holder 12, and the energizing to the heater 11 takes place so that the heat of the heater 11 increases and adjusts the temperature of the fixing nip portion N. In this state, the recording member P having an unfixed toner image born thereon is introduced along a heat-resisting fixing entrance guide 15 into the fixing nip portion N, where the unfixed toner image bearing surface side of the recording member P is brought closely into contact with the outer surface of the fixing film 13, so that the recording member P, together with the fixing film 13, is conveyed in the nipped condition.

In this nipping and conveying process of the recording member P, the heat of the heater 11 is given through the fixing film 13 to the recording member P, so that the unfixed toner image is heated under the pressure to be fixed on the recording member P.

After passing through the fixing nip portion N, the recording member P is separated at a curvature from the outer surface of the fixing film 13 to be discharged onto a delivery tray (not shown).

The heater 11 (ceramic heater) is an energizing heating member constructed such that an energizing heat-generation resistance layer made of, for example, Ag/Pd (silver palladium), $RuO_2$ or $Ta_2N$ is coated and formed on a surface of a high insulation ceramic substrate such as alumina in its longitudinal direction according to the screen printing technique, with this energizing heat-generation resistance layer being formed to have a linear or string-like configuration with a thickness of approximately 10 μm and a width of approximately 1 to 5 mm.

On the rear surface of the ceramic substrate, there is placed a temperature detecting element 14, such as a thermistor, which is for sensing the temperature of the ceramic substrate rising in accordance with the energizing heat-generation resistance layer. On the basis of the signal from the temperature detecting element 14, control is implemented to set appropriately the duty ratio, the wave number or the like of the voltage to be applied from an electrode portion (not shown) existing at its longitudinal end portion to the energizing heat-generation resistance layer, thereby maintaining the controlled temperature in the fixing nip portion N constantly for heating needed for the fixing of the toner image on the recording member P.

The DC energizing from the temperature detecting element 14 to a temperature control portion (not shown) is achieved by a DC energizing portion (not shown) and a DC electrode portion (not shown) through a connector (not shown). Additionally, on the surface of the energizing heat-generation resistance layer of the heater 11, there is provided a protective layer such as a thin glass coat capable of being proof against the friction with the fixing film 13.

The elastic pressure roller 20 serving as a pressure member is composed of the core 21 and an elastic layer 22 made from a heat-resisting rubber such as a silicone rubber or a fluoro rubber or made by foaming a silicone rubber. Additionally, formed on the elastic layer 22 is a fluororesin release-characteristics layer 23 made of a perfluoroalkoxy resin (PFA), a polytetrafluoroethylene resin (PTFE), a tetrafluoroethylene-hexafluoropropylene resin (FEP) or the like. The fluororesin release-characteristics layer 23 can also be, if needed, a conductive fluororesin made by doping an electrical conduction giving material such as a conductive carbon black.

Figure 3A:
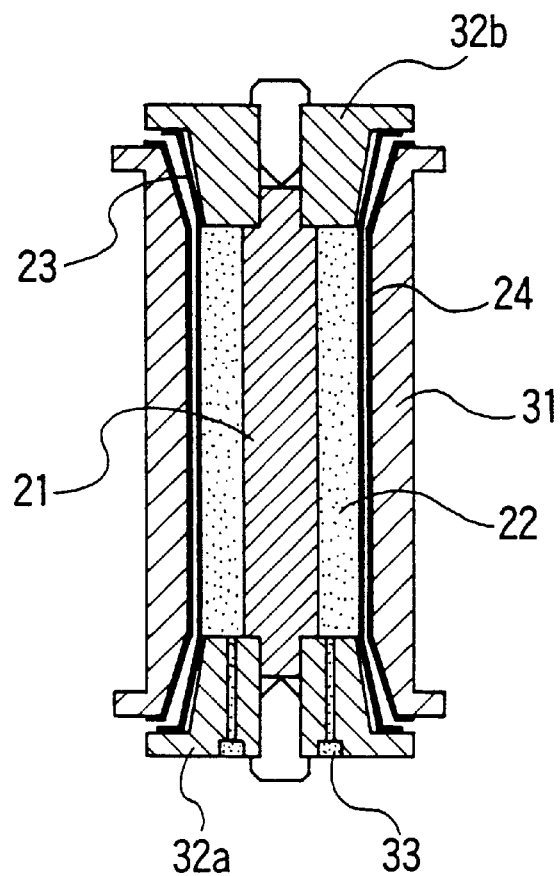
FIG. 3A is a vertical cross-sectional view showing, in the form of a model, a tube-covered roller manufacturing apparatus which is in the process of producing a roller, according to a first embodiment of the invention.
Figure 3B:
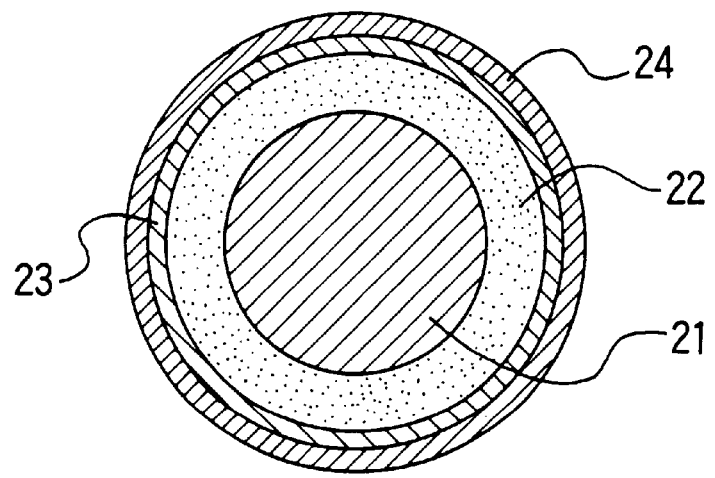
FIG. 3B is a horizontal cross-sectional view showing, in the form of a model, a layer construction of a pressure roller in such a state that a cylindrical tube stands outside a fluororesin tube layer.

Referring to FIGS. 3A and 3B, a description will be given hereinbelow of a method of manufacturing the pressure roller 20. FIG. 3A is a vertical cross-sectional view showing, in the form of a model, a manufacturing apparatus which is in the process of producing a roller. In FIG. 3A, reference numerals 21, 22, 22 and 23 denote respectively a core made of a metal such as aluminum, a silicone rubber formed by heating and curing a liquid silicone rubber, and a fluororesin tube serving as a release-characteristics layer in the pressure roller 20 to be incorporated into a heat fixing device as described above.

Preferably, the thickness of the fluororesin tuber 23 is in the range of 10 μm to 200 μm for the purpose of satisfying the durability and of keeping the product hardness of the pressure roller below a predetermined value for the formation of the fixing nip portion.

The inner surface of the fluororesin tube 23 is treated according to a chemically treating method using a solution that metal sodium and naphthalene are dissolved in a THF such as Tetra-H (trade name; produced by Junkosha Co., Ltd.) or an ethylene glycol dimethtl ether, a chemically treating method using a solution that metal sodium is dissolved in liquid ammonia, a chemically treating method using an alkali-metal mercury amalgam, an electrolytic reducing method, a corona discharge treating method, a treating method using an inactive gas plasma such as helium or argon, a treating method using an excimer laser, and, subsequently, a silicone-based primer such as Kemlock 607 (trade name; produced by Road Far East Incorporated) is applied thereonto for enhancing the adhesion to the elastic layer 22.

Reference numeral 24 denotes a cylindrical tube made of a heat-resisting resin, for example, a fluororesin such as a PFA, a PTFE or an FEP, a polyamide resin such as a nylon 6, a nylon 66, a nylon 8 (N-methoxymethyl nylon), a nylon 11, a nylon 12 or an aromatic polyamide, a polyester resin such as a polyethylene terephthalate or a polybutylene terephthalate, a polyphenylene sulfide (PPS) and a polyimide. The inner diameter of the cylindrical tube 24 is approximately equal to or slightly larger than the outer diameter of the fluororesin tube 23. The melting point of the cylindrical tube 24 is above 200° C.

The wall thickness of the cylindrical tube 24 is not particularly limited, but is set to a value which can offer the easy-to-handle. The inner surface of the cylindrical tube 24 is not treated at all, or a release agent is applied thereonto. The cylindrical tube 24 is fitted outside the fluororesin tube 23 in advance. Alternatively, the fluororesin tube 23 and the cylindrical tube 24 are successively fitted in a mold, which will be described hereinafter to make the covered condition thereof.

(1) In the method of manufacturing the pressure roller 20, a pressure roller core 21, whose outer circumferential surface is previously coated with an addition type adhesive, is set in one of end portion molds 32a and 32b which can be fitted in the upper and lower end portions of a cylindrical mold 31.

(2) Subsequently, the fluororesin tube 23 and the cylindrical tube 24 organizing the aforesaid double configuration are mounted on one of the end portion molds 32a and 32b. Alternatively, the fluororesin tube 23 and the cylindrical tube 24 are inserted between the outer side of the core 21 and the inner side of the cylindrical mold 31, and the end portion molds 32a and 32b are respectively fitted on the upper and lower end portions of the cylindrical mold 31 to fix the fluororesin tube 23 and the cylindrical tube 24.

(3) Following this, the end portion molds 32a and 32b are fitted in the upper and lower end portions of the cylindrical mold 31, and a liquid silicone rubber 22 is injected under a high pressure into the gap between the core 21 and the fluororesin tube 23 through an injection opening 33 made in the end portion mold 32a, so that the gap is filled with the liquid silicone rubber 22.

This filling pressure expands the fluororesin tube 23 and the cylindrical tube 24 to make them come into close contact with the inner circumferential surface of the cylindrical mold 31, so that the fluororesin tube 23 is integrated with the silicone rubber material 22.

In this case, the inner diameter of the cylindrical mold 31 is set at the outer diameter of the pressure roller 20 to be manufactured plus the thickness of the cylindrical tube 24.

Furthermore, in order to improve the working efficiency at the release from the cylindrical mold 31, it is also possible that a release agent is applied on the inner surface of the cylindrical mold 31.

(4) In a state in which the core 21, the liquid silicone rubber 22, the fluororesin tube 23 and the cylindrical tube 24 are set in the cylindrical mold 31, the pressure roller 20 is heated at a temperature of approximately 70° C. to 120° C. for one to three hours to cure the silicone rubber 22.

(5) After being cooled, the respective molds are removed to release the pressure roller 20, and subsequently, the pressure roller 20 is heated at a temperature of approximately 180° C. to 220° C. for approximately three to five hours.

In consequence, it is possible to produce a pressure roller having such a shape that the cylindrical tube 24 is fitted over the resin tube 23, as shown in FIG. 3B.

(6) Last, the cylindrical tube 24 formed outside the fluororesin tube 23 is peeled off. Accordingly, the manufacturing worker does not touch the surface of the fluororesin tube 23 and the contamination on the inner surface of the cylindrical mold 31 does not adhere to the surface of the fluororesin tube 23, and further, the transfer of the scratches or the like on the inner surface of the cylindrical mold 31 hardly occurs, so that the pressure roller 20 with an excellent surface property is obtainable.

Alternatively, after the respective molds are removed to release the pressure roller 20, the cylindrical tube 24 may be peeled off, and subsequently, the pressure roller 20 may be heated at a temperature of approximately 180° C. to 220° C. (In short, at least when the pressure roller 20 is situated inside the cylindrical mode 31, the pressure roller 20 is in a state of being covered with the cylindrical tube 24.)

In the present invention, the kind of the rubber of the elastic layer 22 is not particularly limited, but in the case of the pressure roller, a polyorganosiloxane composition containing a vinyl radical, that is, a silicone rubber, is used generally. As the silicone rubber, for example, there is used 2, 5-dimethyl-2, 5-di(t-butylperoxy) hexane which can be vulcanized with a conventional peroxide, and in addition to this, among the silicone rubbers, for example, there are SH52U SH831U, SH841U, SHB51U (trade names; produced by Dow Corning Toray Silicone Co., Ltd.), KE152U, KE153U, KE167U, KE172U (trade names; produced by Shin-Etsu Chemical Co., Ltd.), and TSE221-3U, TSE221-4U (trade names; produced by Toshiba Silicone Co., Ltd.).

In addition, according to the using and designing purposes, it is possible to introduce, into the elastic layer 22, various types of additives including a filler, an extender filler, a vulcanizing agent, a coloring agent, a conductive substance, a heat-resisting agent, a pigment and others.

Although the compounding formulation of the filler to the elastic layer 22 is not particularly limited, in general, for example, when the rubber serving as a base assumes 100 parts by weight, a reinforcing filler and an extender filler are introduced by 10 to 300 parts by weight thereinto.

As the common reinforcing fillers, there are commonly used a carbon black, a wet silica and a dry silica.

In this case, the wet silica signifies a reinforcing silica containing silicon dioxide, and as manufacturing methods, there are various methods, such as the direct method in which sodium silicate is directly dissolved with sulfuric acid and the indirect method in which sodium silicate is reacted with salt to produce a silicate, which in turn, is dissolved with sulfuric acid or carbon dioxide.

The dry silica is a reinforcing silica containing silicon dioxide, produced according to the pyrolysis of silicon hydrogen, the air oxidation of SiO in which silica sand is heated for reduction and vaporized, or the pyrolysis of an organic silicon compound.

In the present invention, it is also possible that one of the wet silica and the dry silica is used appropriately according to needs.

Furthermore, for the purpose of preventing the secondary binding by the activity of the silica surface, a lubricant can be introduced thereinto, As the lubricants, for example, there are silicone resin groups, alkoxysilane and siloxane groups, hydroxysilane and siloxane groups, silazane groups, organic ester groups, polyhydroxy alcohols.

The expander filler is a component needed for maintaining the functional characteristics of the elastic layer, such as the physical strength, the rubber hardness, the compression permanent distortion and others, and among the expander fillers, for example, there are calcium carbonate, ground quartz, diatomite, novaculite, zirconium silicate, aluminum silicate, talc, zinc oxide, magnesium oxide, iron oxide, mica, graphite and others.

In addition, as the filler for providing the electrical conduction to the elastic layer 22 when needed, a conductive carbon black such as an acetylene black or Ketjenblack is used commonly, and further, for example, there are metallic powders such as graphite, silver, copper and nickel, conductive calcium carbonate, carbon fibers and others.

Still furthermore, as the coloring agent, there can be used a red oxide for rubbers prescribed in SRIS110 (Nihon Rubber Institute Standard).

As the vulcanizing agent, in the case of the heat-curable silicone rubber, organic peroxides for silicone rubbers are usable ordinarily, and among the common vulcanizing agents, for example, there are dicumylperoxide, 2, 5-dimethyl- 2, 5-di-(tertbutylperoxy)-hexane, and others.

The pressure roller 20 manufactured according to the above-described embodiment was incorporated into the heat fixing device 6 to make a check for the release characteristics.

As the method, 100 pressure rollers were manufactured using the same molds 31, 32a and 32b, and of these pressure rollers, some were put to the durability (endurance) test. During the manufacturing of the pressure rollers, the molds 31, 32a and 32b were not especially cleaned and were used in succession.

In addition, as the comparative example, 100 pressure rollers were manufactured using the same molds according to a conventional method which does not employ the cylindrical tube 24 to be put outside the fluororesin tube 23 in the present embodiment, and were similarly put to the durability test.

Table 1 shows the evaluation results. As the durability test in the image forming apparatus, the print of 400,000 sheets was conducted in succession. Subsequently, the toners attached onto the pressure roller surfaces were observed and the evaluation was made on the basis of the difference among the toner quantities attached. In the Table 1, "○" signifies a clean state that no toner contamination occurred, "Δ" signifies a state that the toner contamination somewhat occurred, and "X" means a poor state that the toner contamination occurred.

TABLE 1

| Number of Rollers Manufactured | 10 | 20 | 40 | 70 | 100 |
|---|---|---|---|---|---|
| The Present Embodiment | ○ | ○ | ○ | ○ | ○ |
| Conventional Example | ○ | Δ | Δ | x | x |

According to the present embodiment, a clean state of the pressure roller surface is always achievable, so that the problem of the contamination or the like by the toner attachment does not arise.

Meanwhile, in the case of the conventional example, there is a tendency that the toner contamination on the pressure roller grows more serious in accordance with the use frequency of the molds. Accordingly, according to the conventional technique, there is a need to clean or reclaim the molds periodically, which leads to a considerable increase in the manufacturing cost.

As described above, according to the present embodiment, the dirt adhesion to the pressure roller surface by the contamination of the molds and the direct touch of the manufacturing worker does not occur at all, the frequency of the mold cleaning and reclaiming is reducible and the scratches on the inner surfaces of the molds are hardly transferred to the pressure roller surface, so that the tolerance for the scratches on the inner surfaces of the molds can be greatly increased.

Thus, a pressure roller 20 having a sufficiently excellent surface condition is attainable, and even if it is used long in a state of being built in the heat fixing device 6, problems including the toner contamination do not arise.

Furthermore, in the present embodiment, although the core 21, the fluororesin tube 23 and the cylindrical tube 24 are simultaneously mounted in the molds to manufacture the pressure roller, it is also possible to employ a method in which, after the release from the molds, the roller which is in a state where the elastic layer 22 is formed on the core 21 is inserted into the fluororesin tube 23. That is, a roller, which is in a state where a silicone sponge produced as the elastic layer 22 by foaming the silicone rubber or the silicone rubber material is formed on the core 21 through an adhesive such as an additive silicone rubber, is shaped or ground into a configuration having a predetermined outer diameter. Thereafter, the aforesaid cylindrical tube 24 is fitted over the non-shrinking fluororesin tube 23 having a diameter smaller than the outer diameter of the roller to produce a double-configuration tube 23, 24 as the fluororesin tube 23 and, in a state where this double-configuration tube 23, 24 is expanded in a pressure-reducing container, the aforesaid roller (roller in which the elastic layer 22 is formed on the core 21) is inserted into the double-configuration tube 23, 24 and then exposed to the normal pressure, so that the fluororesin tube 23 is brought into close contact with the surface of the elastic layer 22.

Alternatively, the double-configuration tube 23, 24 is all made as a heat contraction tube, and a roller on which the elastic layer 22 is formed is inserted into the fluororesin tube 23 of the expanded double-configuration tube 23, 24 and heated, so that the fluororesin tube 23 is brought into close contact with the elastic layer 22 by the heat contraction, thereby producing the pressure roller.

After the pressure roller equipped with the double-configuration tube 23, 24 is manufactured according to the above-mentioned method, only the cylindrical tube 24 constituting the uppermost surface is removed, thus providing a pressure roller covered with a fluororesin tube having a clean surface.

As the silicone rubber, the above-mentioned material and addition agent are put to use, and as the silicone sponge rubber, a material such as KE901U, KE903U, KE904FU (trade names; produced by Shin-Etsu Chemical Co., Ltd.), or XE21-A9915 (trade name; Toshiba Silicone Co., Ltd.) is properly used together with a sponging agent.

In the description of the present embodiment, although the pressure roller is used for a heat fixing device, naturally, the manufacturing method according to the present embodiment is applicable to, for example a heating roller serving as a roller for fixing which functionally requires the release characteristics of the roller surface and in which the elastic layer 22 and the fluororesin tube 23 are placed on the core 21.

Figure 4:
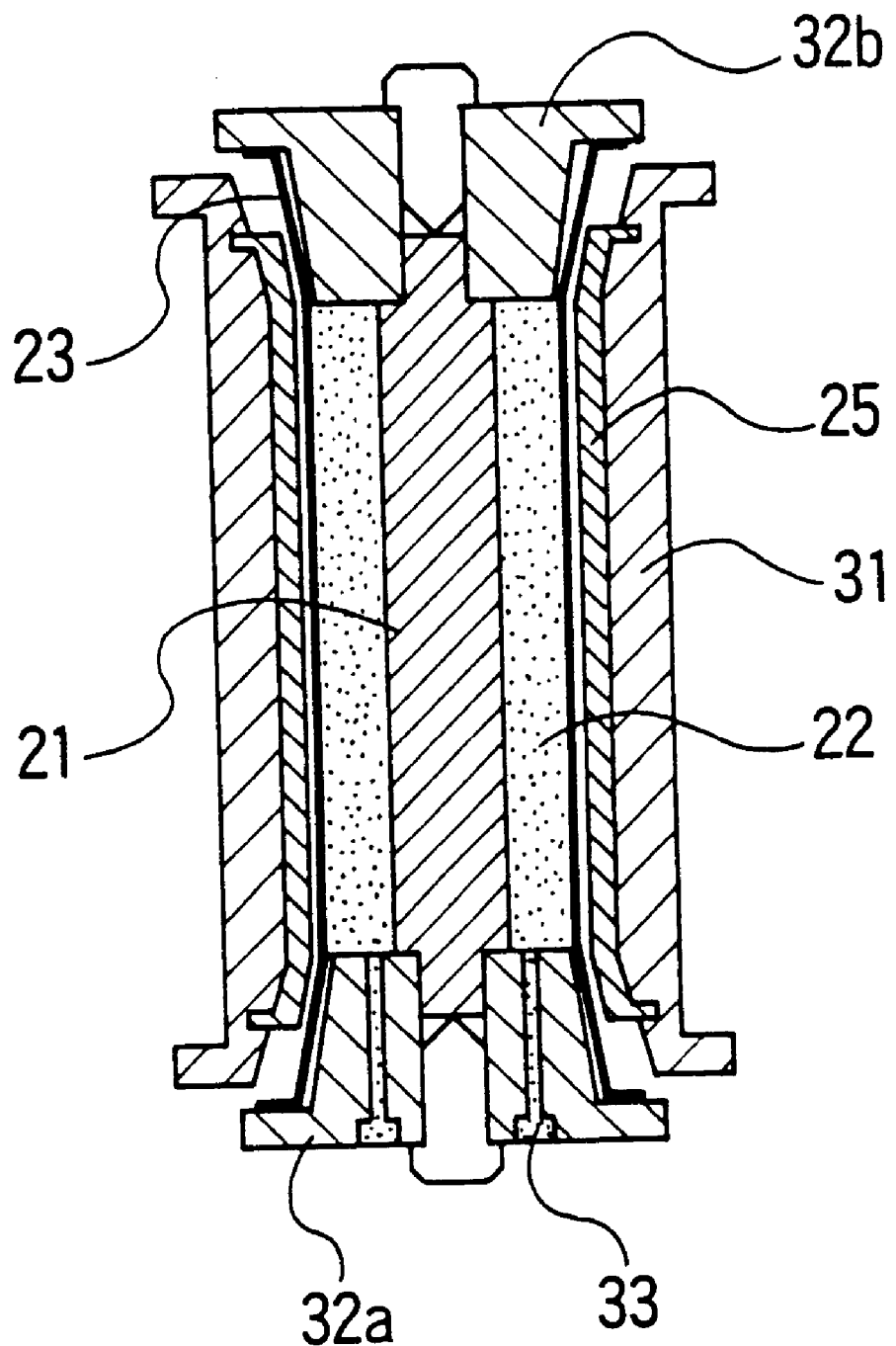
FIG. 4 is a vertical cross-sectional view showing, in the form of a model, a tube-covered roller manufacturing apparatus which is in the process of producing a roller, according to a second embodiment of the invention.

Second Embodiment
(FIG. 4)

A description will be given hereinbelow of a second embodiment of the invention. In the second embodiment, the entire construction of the image forming apparatus and the construction of the heat fixing device 6 are similar to those of the above-described first embodiment shown in FIGS. 1 and 2, and the description thereof will be omitted for brevity.

In the second embodiment, a pressure roller is manufactured in such a manner that a resin-made member attachable/detachable is placed on the inner surface of a cylindrical mold.

Referring to FIG. 4, a detailed description will be given of a method of manufacturing a pressure roller according to the second embodiment. FIG. 4 is a vertical cross-sectional view showing, in the form of a model, a pressure roller manufacturing apparatus which is in the process of producing a pressure roller. In FIG. 4, reference numeral 25 denotes a resin-made member attachable/detachable to/from an inner surface of a cylindrical mold 31, and the inner diameter of the resin-made member 25 is substantially equal to an intended outer diameter of a pressure roller to be manufactured. Among the materials for the resin-made member 25, for example, there are a fluororesin such as a PFA, a PTFE or an FEP, a polyamide resin such as a nylon 6, a nylon 66, a nylon 8 (N-methoxymethyl nylon), a nylon 11, a nylon 12 or an aromatic polyamide, a polyester resin such as a polyethylene terephthalate or a polybutylene terephthalate, a polyphenylene sulfide (PPS) and a polyimide, which are sufficiently proof against the pressure roller burning temperature.

(1) In a state where the resin-made member 25 is set on the inner surface of the cylindrical mold 31, a pressure roller core 21 and a fluororesin tube 23 are mounted in one of end portion molds 32a and 32b and the end portion molds 32a and 32b are fitted in the cylindrical mold 31 in which the resin-made member 25 is mounted.

(2) In the above state, a liquid silicone rubber 22 is injected under a high pressure into the gap between the pressure roller core 21 and the fluororesin tube 23 through an injection opening 33 of the end portion mold 32a, as described in the first embodiment, and owing to that filling pressure, the fluororesin tube 23 is expanded to be brought into close contact with the inner circumferential surface of the resin-made member 25 mounted on the inner surface of the cylindrical mold 31, and is then heated to cure the silicone rubber 22.

(3) Following this, the pressure roller is released from the end molds 32a and 32b and the cylindrical metallic mold 31 carrying the resin-made member 25, thereby offering a pressure roller with an excellent surface characteristic.

After the release from the molds, the resin-made member 25 is removed from the cylindrical mold 31 and a new resin-made member 25 is again attached to the cylindrical mold 31. Accordingly, it is possible to always provide a pressure roller whose fluororesin tuber surface shows an excellent surface property.

After the manufacture of the pressure roller, the resin-made member 25 detached from the cylindrical mold 31 is discarded or reclaimed. Alternatively, in the case in which the resin-made member 25 is made of a PEEK, a PPS, a polyimide or the like, even after being used a given number of times, the outer surface of the fluororesin tube 23 is maintainable in a good condition. Accordingly, if the cylindrical resin-made member attached to the cylindrical mold is replaced with new one after being used a predetermined number of times, the fluororesin tube can always show an excellent surface condition, and the cylindrical mold is usable almost permanently.

In the second embodiment, not only a pressure roller with an excellent surface characteristic is always obtainable, but also the working efficiency is improvable because the troubles in doubling tube-like thin members and the troubles in peeling off the uppermost cylindrical tube after the release from the molds are eliminable. In addition, since the uppermost surface of the pressure roller is formed along the inner circumferential surface of the resin-made mold, for example, there is no need to clean the inner circumferential surface of the cylindrical mold particularly.

In the second embodiment, although the pressure roller is taken as an example as well as the above-described first embodiment, the second embodiment is not limited to the pressure roller manufacturing method, but is also applicable to a heating roller and others.

Figure 5A:
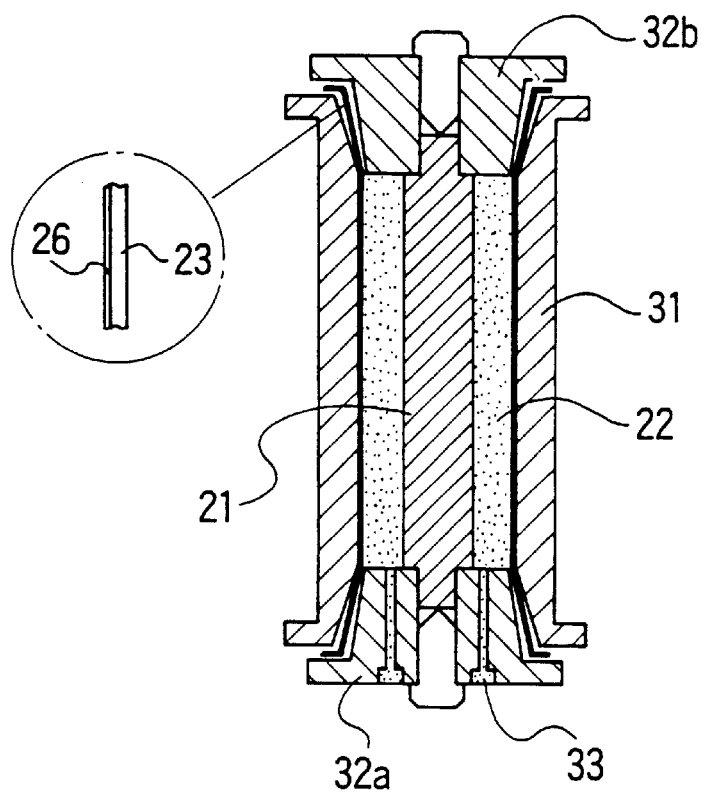
FIG. 5A is a vertical cross-sectional view showing, in the form of a model, a tube-covered roller manufacturing apparatus which is in the process of producing a roller, according to a third embodiment of the invention.
Figure 5B:
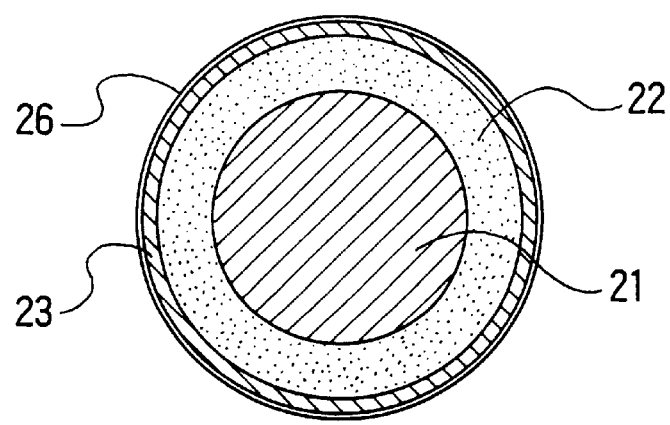
FIG. 5B is a horizontal cross-sectional view showing, in the form of a model, a layer construction of a pressure roller in such a state that a resin layer stands outside a fluororesin tube layer.
Figure 6:
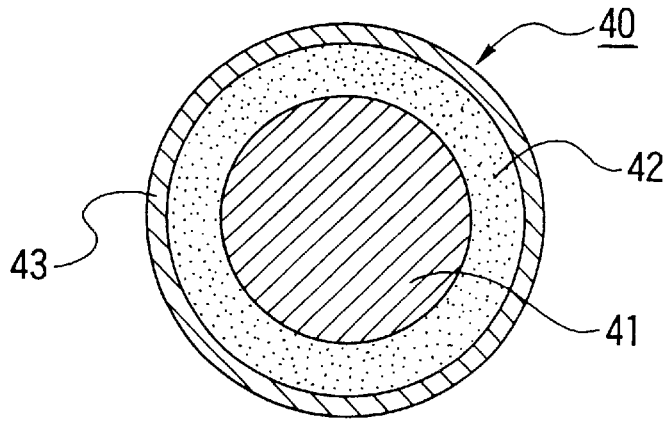
FIG. 6 is a horizontal cross-sectional view showing a layer construction of a pressure roller.
Figure 7:
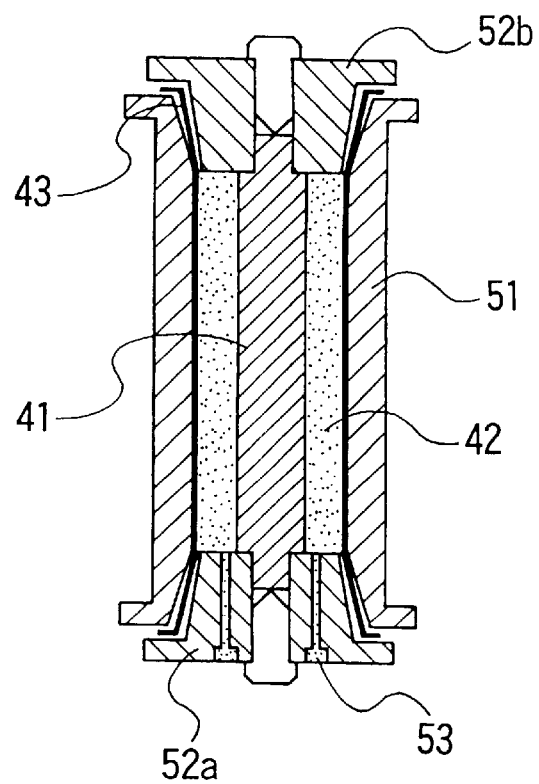
FIG. 7 is a cross-sectional view showing a conventional tube-covered roller manufacturing apparatus.

Third Embodiment
(FIGS. 5A and 5B)

A description will be made hereinbelow of a third embodiment of the invention. In the third embodiment, the entire construction of the image forming apparatus and the construction of the heat fixing device 6 are similar to those of the above-described first embodiment shown in FIGS. 1 and 2, and the description thereof will be omitted for simplicity.

As shown in FIGS. 5A and 5B, an outer surface of a fluororesin tube 23 is beforehand coated with a thermosetting resin layer (coating material) 26, and in this state, the fluororesin tube 23 is set in a mold to manufacture a pressure roller. FIG. 5A shows a roller which is in the process of being produced, and FIG. 5B shows the roller in a state where, immediately after being taken out from the mold, the roller is still covered with the resin layer 26.

A detailed description will be given hereinbelow of a method of manufacturing a pressure roller according to the third embodiment. In the third embodiment, for example, on an outer surface of a fluororesin tube, a resin such as a polyamide resin, a polyester resin, an urethane, an acrylate resin and a polycarbonate or a silicone coating material such as HS-1, HS-2, HS-3 or HS-4 (trade names; produced by Toshiba Silicone Co., Ltd.), which shows a thermosetting property, is applied by, for example, the spraying, dipping, brushing or flowing technique to produce a protective layer having a thickness of approximately several $\mu$m to 10 $\mu$m.

This protective layer (coating material) can prevent the outer surface of the fluororesin tube from coming directly into contact with the inner surface of the mold and prevent the hand of the manufacturing worker from touching the outer surface of the fluororesin tube.

The manufacturing method is as follows.

(1) For example, the aforesaid HS-2 is applied on the surface of a fluororesin tube 23 and, after the HS-2 is dried, the fluororesin tube 23, together with a pressure roller core 21, is set to an end portion mold 32a or 32b mentioned in the first embodiment.

(2) Following this, as well as the first embodiment, the upper and lower end portion molds 32a and 32b are fitted in a cylindrical mold 31. In this state, a liquid silicone rubber 22 is injected under a high pressure into the gap between the pressure roller core 21 and the fluororesin tube 23 through an injection opening 33 of the end portion mold 32a, so that the gap is filled with the liquid silicone rubber 22. This filling pressure expands the fluororesin tube 23, so that the fluororesin tube 23 is brought into close contact with the inner circumferential surface of the cylindrical mold 31, and a heating treatment is made to cure the silicone rubber 22 and the coating material 26 applied on the outer surface of the fluororesin tube 23.

(3) After that, the roller is released from the end portion molds 32a and 32b and the cylindrical mold 31, and last, the coating material 26 is peeled off from the fluororesin tube 23, thereby obtaining a pressure roller having a good surface characteristic.

In this case, although the coating material 26 is heated and cured to form a tube-like configuration, it is also appropriate to form it into a tube-like configuration in the UV (ultraviolet ray) curing way, or to retain a resin powder condition.

According to the third embodiment, since a coating showing high release characteristics is made on the outer surface of the fluororesin tube 23, the troubles such as doubling of the tubes are eliminable and, hence, the working efficiency is improvable. Additionally, since the coating material applied on the outer surface of the fluororesin tube and the pressure roller elastic layer 22 are cured simultaneously into tube-like configurations, after the manufacturing, the coating material is easily removable from the pressure roller surface in the peeling way.

In addition, as compared with the use of the cylindrical tube covering the outer surface of the fluororesin tube in the above-described first embodiment, the formation of the thin release-characteristics tube is easily feasible without decreasing the working efficiency. Accordingly, the volume of the member to be removed is reducible to decrease the waste.

In the third embodiment, although a release-characteristics coating material is applied onto the outer surface of the fluororesin tube 23 and, after the fluororesin tube 23 is fitted over a mold, the coating material and the silicone rubber 22 are cured concurrently, it is also appropriate that, after the fluororesin tube 23 is coated, before it is set in the mold for manufacturing a pressure roller, the fluororesin tube 23 carrying the applied release-characteristics coating material is heated to cure the coating material. In this case, it is also possible to employ a method of, after a silicone rubber or a silicone sponge is fitted over a core, putting the fluororesin tube 23 around the silicone rubber or a silicone sponge.

In the third embodiment, although the pressure roller is taken as an example as well as the above-described first embodiment, the third embodiment is not limited to the pressure roller manufacturing method, but is also applicable to a heating roller and others.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A method of manufacturing a tube-covered roller for image fixing, comprising the steps of:
    setting a core material in a substantially central portion of a cylindrical mold and setting, outside said core material, a first tube and a resin layer which is capable of coming into contact with an inner surface of said mold;
    putting a rubber material between said core material and said first tube and hardening said rubber material to produce a roller; and
    after detaching said roller covered with said tube and said resin layer from said mold, removing said resin layer from said roller.

2. A method according to claim 1, wherein, after said resin layer is placed on said tube, said first tube and said resin layer, integrated with each other, are set in said mold.

3. A method according to claim 1, wherein said first tube and said resin layer are separately set in said mold.

4. A method according to claim 1, wherein said tube is a fluororesin tube.

5. A method according to claim 1, wherein said resin layer is a second tube different from said first tube.

6. A method according to claim 5, wherein said second tube serving as said resin layer has a melting point above 200° C.

7. A method according to claim 1, wherein said resin layer is one of a coating material applied on said first tube and a coating material hardened.

8. A method according to claim 1, wherein said resin layer is a coating material applied on said first tube, and said coating material hardens with hardening of said rubber material to form into a tube configuration.

9. A method according to claim 1, wherein said roller forms a nip portion in cooperation with a heating member so as to constitute a fixing device.

10. A method according to claim 9, wherein said heating member is a heater to be used through a film.

11. A method of manufacturing a tube-covered roller for image fixing, comprising the steps of:
    placing a resin layer on a first tube;
    covering a roller having a rubber layer with said first tube having said resin layer placed thereon; and
    removing said resin layer from said roller covered with said first tube.

12. A method according to claim 11, wherein said first tube is a fluororesin tube.

13. A method according to claim 11, wherein said resin layer is a second tube different from said first tube.

14. A method according to claim 13, wherein said second tube serving as said resin layer has a melting point above 200° C.

15. A method according to claim 11, wherein said resin layer is constructed by applying a coating material on said first tube and hardening said coating material.

16. A method according to claim 11, wherein said roller forms a nip portion in cooperation with a heating member so as to constitute a fixing device.

17. A method according to claim 16, wherein said heating member is a heater to be used through a film.

18. A method of manufacturing a tube-covered roller for image fixing, comprising the steps of:
    setting a core material in a substantially central portion of a cylindrical mold, setting a tube outside said core material and setting a cylindrical resin member outside said tube in such a way as to come into contact with an inner surface of said mold;
    putting a rubber material between said core material and said tube and hardening said rubber material to produce a roller; and
    detaching said roller covered with said tube from said resin member left at said mold.

19. A method according to claim 18, wherein said resin member is replaced at every new production of a roller.

20. A method according to claim 18, wherein said tube is a fluororesin tube.

21. A method according to claim 18, wherein said roller forms a nip portion in cooperation with a heating member so as to constitute a fixing device.

22. A method according to claim 21, wherein said heating member is a heater to be used through a film.

* * * * *

UNITED STATES PATENT AND TRADEMARK OFFICE
CERTIFICATE OF CORRECTION

PATENT NO.    : 6,440,347 B1
DATED         : August 27, 2002
INVENTOR(S)   : Satoru Izawa et al.

It is certified that error appears in the above-identified patent and that said Letters Patent is hereby corrected as shown below:

Column 8,
Line 28, "tuber" should read -- tube --.

Column 10,
Line 63, "5-dimethyl- 2," should read -- 5-dimethyl 2, --.

Signed and Sealed this

Twenty-second Day of April, 2003

JAMES E. ROGAN
*Director of the United States Patent and Trademark Office*